United States Patent
Mizuhara

(10) Patent No.: US 6,522,652 B1
(45) Date of Patent: Feb. 18, 2003

(54) ATM EXCHANGE

(75) Inventor: Bun Mizuhara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/385,447

(22) Filed: Aug. 30, 1999

(30) Foreign Application Priority Data

Aug. 31, 1998 (JP) .......................................... 10-259185

(51) Int. Cl.[7] .............................................. H04L 12/56
(52) U.S. Cl. .................. 370/395.31; 370/397; 370/399
(58) Field of Search .......................... 370/395.1, 395.3, 370/395.31, 394–399, 465–466, 468, 389

(56) References Cited

U.S. PATENT DOCUMENTS 5,440,547 A * 8/1995 Easki et al. ............... 370/395.2
6,137,795 A * 10/2000 Tominaga et al. .......... 370/375
6,295,295 B1 * 9/2001 Wicklund ................... 370/392

FOREIGN PATENT DOCUMENTS

JP 5-199256 8/1993
JP 9-36874 2/1997
JP 11-191779 7/1999

* cited by examiner

*Primary Examiner*—Melvin Marcelo
*Assistant Examiner*—Inder Pal Mehra
(74) *Attorney, Agent, or Firm*—Foley & Lardner

(57) ABSTRACT

To provide all ATM exchange wherein more supple collective routing than VP routing is enabled without waste of VPI/VCI resources, an ATM exchange comprises: a VPI/VCI converter (1) for retrieving a logic value, which is predetermined for each of individual connections to be dealt with individually and groups of connections to be dealt with collectively, according to an input VPI/VCI value; a mask-bit generator (2) for generating a mask-bit pattern, a number of lower bits of the mask-bit pattern having logic '1' and other upper bits thereof having logic '0' when the mask-bit pattern concerns one of the groups of connections; and a VPI/VCI bit selector (3) for generating an output VPI/VCI value to be written in the VPI/VCI field of the cell, by selecting logic of each bit of the output VPI/VCI value to have the same logic with a corresponding bit of the logic value outputted from the VPI/VCI converter (1) when a corresponding bit of the mask-bit pattern has logic '0', and to have the same logic with a corresponding bit of the input VPI/VCI value when a corresponding bit of the mask-bit pattern has logic '1'.

4 Claims, 8 Drawing Sheets

( INPUT PORT SIDE )

( OUTPUT PORT SIDE )

ATM EXCHANGE

BACKGROUND OF THE INVENTION

The present invention relates to an ATM (Asynchronous Transfer Mode) exchange which is used as a high-speed exchange node of a large scale network such as the Internet.

In the network composed of ATM exchanges, data are transmitted being divided into cells having fixed data length. A VC (Virtual Connection) is established through ATM exchanges to link each pair of terminal points. At the data transmission terminal point, frame data supplied from an upper layer are segmented into transmission cells, which are transmitted in the network being switched node by node so as to follow their own VC through the ATM exchanges and arrive to the destination terminal point. At the destination terminal point, received cells are reassembled again into the frame data, for example.

For identifying the VC, identifier information called VPI/VCI (Virtual Path Identifier/Virtual Channel Identifier) is included in each cell header, and, independently in each link connecting two neighboring exchange nodes, an individual VPI/VCI is assigned for a specific VC, for economizing VPI/VCI resources.

According to the VPI/VCI of a cell arriving to an ATM exchange through an input port, the ATM exchange performs routing of the cell, that is, determines an output port connected to a link where the concerning cell is to be forwarded and rewrites the VPI/VCI into another value which is assigned in the output link for the concerning VC. For this purpose, the ATM exchange is provided with a routing table where connection information of each VC is described when the VC is established between a pair of terminal points.

A VC which is established fixedly by a network manager, for example, is called a PVC (Permanent VC) and a VC which is established temporarily when a need of data exchange occurs is called a SVC (Switched VC). The PVC, which should be settled manually, is not practical for a large scale network. On the other hand, a complicated and time needing procedure is required every time when a VC is established, according to the SVC. Therefore, automatic and high-speed connection management method applicable for a large scale network is earnestly pursued recently, and there has been proposed, for example, a network provided with ATM exchanges which organize connections autonomically by self-learning topology of the network.

In any way, connection information such as the routing table should be provided for each ATM exchange to perform routing of cells.

Usually, data fields of 12 bits and 16 bits are assigned for the VPI and the VCI, respectively, in a cell header. Therefore, a routing table having a memory space of more than $2^{28} \times 28$ bits is required for an ATM exchange, when rewrite data of all possible logic values of the input VPI/VCI are described in the routing table.

In a Japanese patent application laid open as a Provisional Publication No. 199256/'93, there is disclosed a method for reducing the memory space of the routing table according to the number of active VPI/VCI values. In this method, 16 bits of a VCI value, for example, are divided into 4×4 bits. First, a routing table is accessed with an address indicated by first 4 bits of the VCI. The contents of the routing table thus obtained through the first access is used as upper its of the address data for the second access to the routing table, together with second 4 bits of the VCI which are used as lower bits of the address data. In the same way, the routing table is accessed 4 times with address data composed of previous retrieval results and partial bits of the VCI. The retrieval result of fourth access is used as the rewrite data of the VCI. This prior art describes that the memory space of a routing table for rewriting the VCI of 16 bits can be reduced from $2^{16} \times 16 = 64$ k bits into at most 20368×16 bits on condition the number of active VCI value is 1000.

Usage of a CAM (Contents Addressable Memory) is also a well-known method for reducing the memory space of the routing table when the number of active values, that is, the number of connections actually established is smaller than the number corresponding to bit length of the VPI/VCI.

Furthermore, the number of connections itself becomes considerably large when the network scale becomes large, because it increases in proportion to a square of the number of terminal points to be linked with each other. Therefore, it is preferable for the large scale network if a plurality of connections can be treated as a group by joining data streams flowing towards a specific terminal point or flowing ill a specific direction.

However, once a plurality of data streams are joined, that is, a common VPI/VCI is assigned to a plurality of connections, cells cannot be reassembled into frame data to be transferred to an upper layer, the AAL 5 (ATM Adaptation Layer 5), for example, even if all the jointed connections are those representing data streams to be terminated by a specific terminal point.

This problem might be resolved by performing queuing of cells frame by frame before joining the data streams. However, this method, which is substantially the same as performing packet exchange, degrades jitter characteristic and distracts real-time data transmission of the ATM network.

Another method of dealing with a plurality of data streams as one group is to perform so called VP routing, by assigning a common VPI for connections of data streams flowing towards a specific direction.

FIG. 8 is a block diagram schematically illustrating a partial configuration, concerning rewriting, or converting, the VPI/VCI, of a conventional ATM exchange wherein the VP routing is performed selectively.

Referring to FIG. 8, the conventional ATM exchange comprises a VPI/VCI converter 1, a VP-routing-bit generator 4 and a VCI selector 5.

The input VPI and the input VCI (a VPI and a VCI value of a cell arriving at an input port of the ATM exchange) is inputted to the VPI/VCI converter 1. The VPI/VCI converter 1 outputs another VPI and VCI value corresponding to the VPI/VCI to be attached to the arriving cell when it is transmitted from an output port, by referring to a routing table which is realized with a CAM, for example.

Here, the VPI/VCI converter 1 outputs dummy data, (0, for example) as the VCI value when the input VPI (and, consequently, the output VPI) has one of certain values assigned for the VP routing, that is, assigned to groups of data streams to be dealt with collectively.

The input VPI is also supplied to the VP-routing-bit generator 4, which outputs a VP routing bit having logic '1', for example, when the input VPI has one of the logic values assigned for the VP routing, while the VP-routing-bit generator 4 outputs a VP routing bit of logic '0' when the input VPI has one of the logic values assigned for ordinary VC routing, that is, assigned to data streams each to be dealt with individually.

The VPI value outputted from the VPI/VCI converter 1 is always used as the output VPI to be attached to the concerning transmission cell. On the other hand, either one of the input VCI itself or the VCI value outputted from the VPI/VCI converter 1 is used as the output VCI, being selected by the VCI selector 5 according to logic of the VP routing bit supplied from the VP-routing-bit generator 4.

Thus, the VPI and the VCI are both rewritten in the cell header according to the VC routing, while only the VPI is rewritten and the input VCI itself is used as the output VCI, in the cell header according to the VP routing, in the conventional ATM exchange.

Through performing the VP routing, a plurality of connections having a common VPI can be dealt with collectively, which enables to reduce connection information to be registered in the routing table.

However, there are following problems in the conventional VP routing as above described.

A problem is that the VCI resources may be wasted being unused. When data lengths of the VPI/VCI are 12 bits and 16 bits, respectively, $65,536=2^{16}$ different VCIs can share a specific VPI value. However, when the VPI value is assigned to a group of 1000 connections, for example, other 64,536 VCIs are left unused.

Another problem is that the number of groups to be dealt with collectively is limited within $4096=2^{12}$, which is inconvenient in the large scale network.

SUMMARY OF THE INVENTION

Therefore, a primary object of the present invention is to provide an ATM exchange wherein more supple collective routing than the conventional VP routing is enabled without waste of VPI/VCI resources.

In order to achieve the object, an ATM exchange of the invention comprises:

a VPI/VCI converter for retrieving a logic value according to an input VPI/VCI value written in a VPI/VCI field of header information of a cell arriving to an input port of the ATM exchange, said logic value being predetermined for each of individual connections to be dealt with individually and groups of connections to be dealt with collectively by the ATM exchange;

a mask-bit generator for generating a mask-bit pattern having the same bit length with the VPI/VCI field, a number, which is predetermined for each of the groups of connections, of lower bits of the mask-bit pattern having logic '1' and other upper bits thereof having logic '0' when the mask-bit pattern concerns one of the groups of connections, and all bits of the mask-bit pattern having logic '0' when the mask-bit pattern concerns one of the individual connections; and a VPI/VCI bit selector for generating an output VPI/VCI value to be written in the VPI/VCI field of the cell before the cell is transmitted from an output port of the ATM exchange, by selecting logic of each bit of the output VPI/VCI value to have the same logic with a corresponding bit of the logic value outputted from the VPI/VCI converter when a corresponding bit of the mask-bit pattern has logic '0', and to have the same logic with a corresponding bit of the input VPI/VCI value when a corresponding bit of the mask-bit pattern has logic '1'.

Therefore, by selecting an appropriate mask-bit length for each group of connections flowing in the same direction, a supple collective routing can be performed with minimum waste of VCI resources, and for a large number of groups up to $2^{27}$, if desired.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
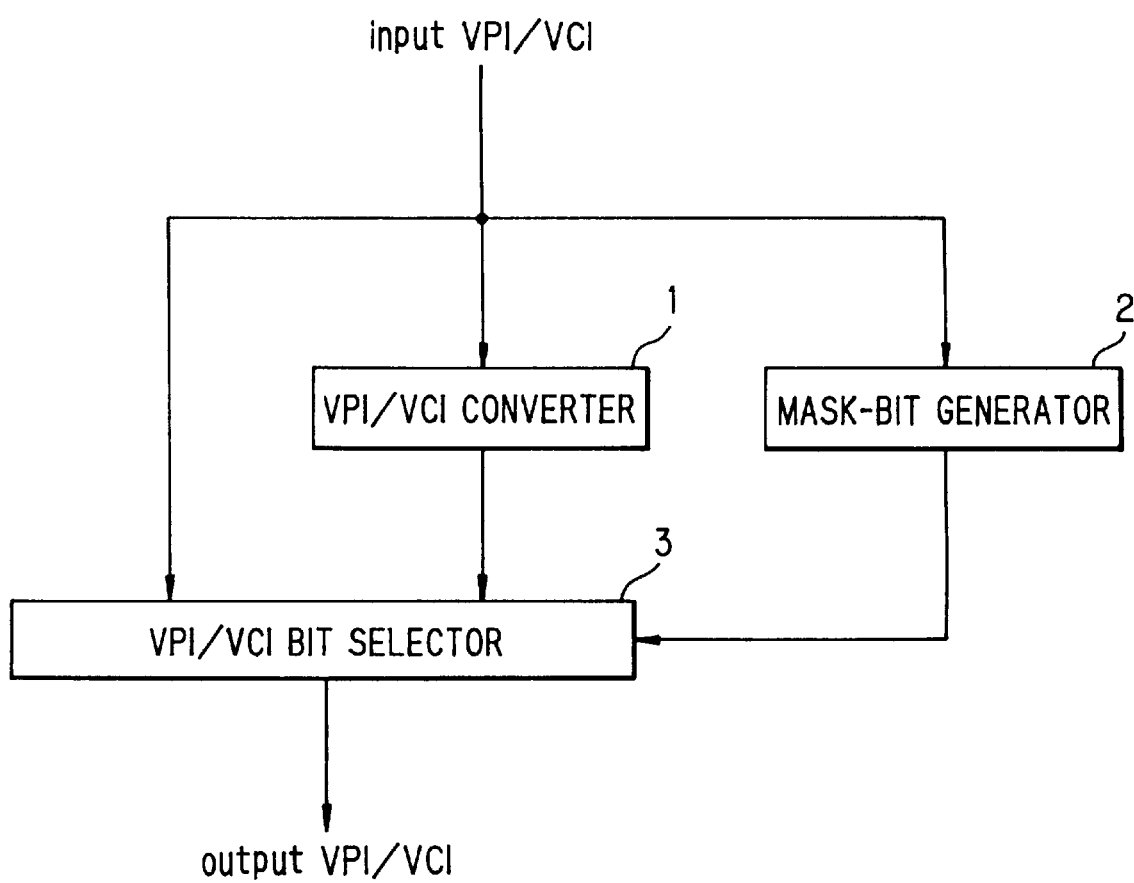
FIG. 1 is a block diagram schematically illustrating a partial configuration of an ATM exchange according to an embodiment of the invention.
Figure 8:
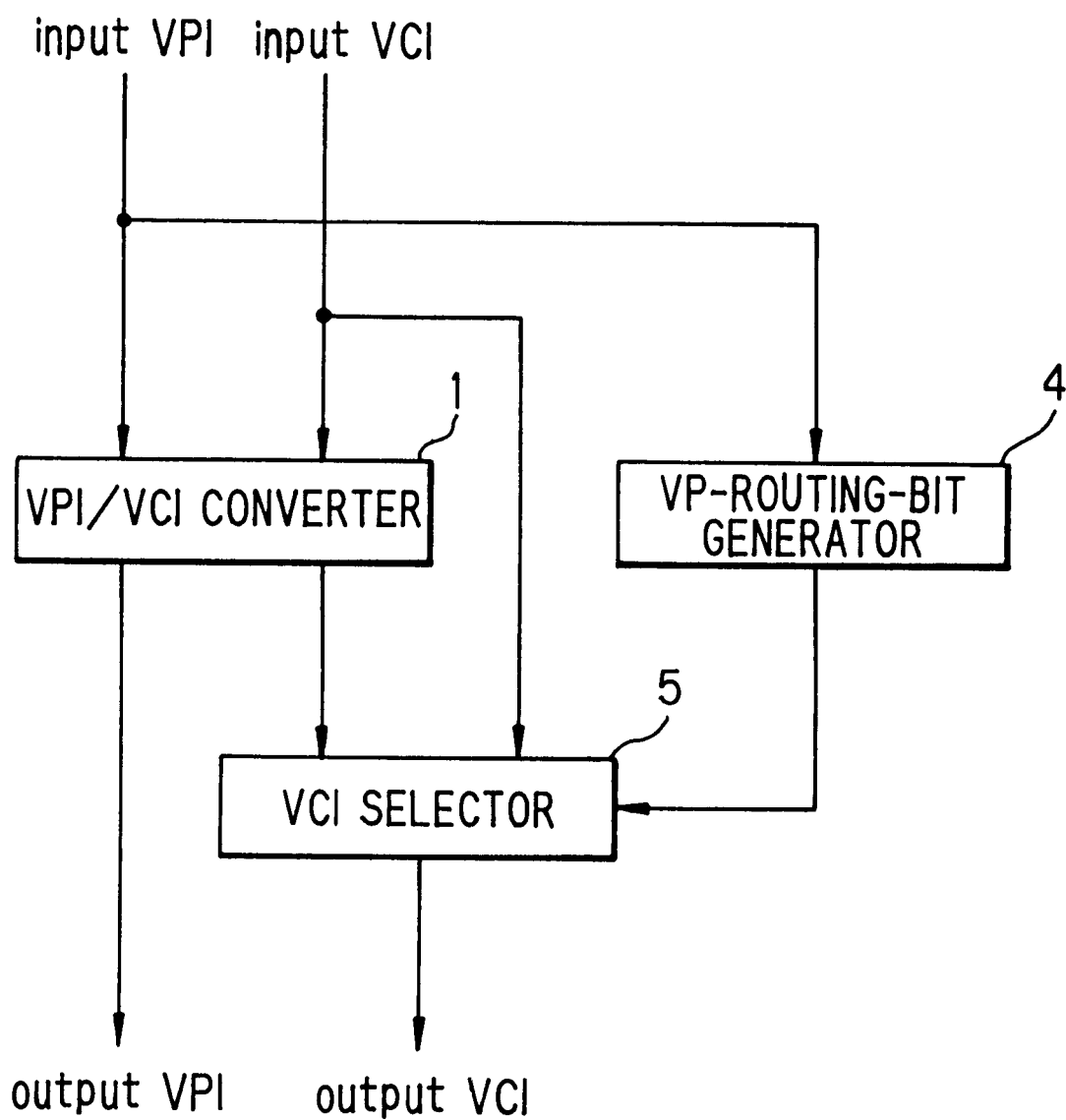
FIG. 8 is a block diagram schematically illustrating a partial configuration, concerning rewriting, or converting, the VPI/VCI, of a conventional ATM exchange wherein the VP routing is performed selectively.

FIG. 1 is a block diagram schematically illustrating a partial configuration of an ATM exchange according to an embodiment of the invention, corresponding to the conventional example of FIG. 8.

The VPI/VCI converter 1 of FIG. 1 has a similar configuration with the VPI/VCI converter 1 of FIG. 8 and retrieves connection information referring to a routing table (not depicted). As to the routing table, any appropriate conventional technology, such as a CAM, may be employed.

Compared to the block diagram of FIG. 8, the VP-routing-bit generator 4 is replaced with a mask-bit generator 2 and the VCI selector 5 is replaced with a VPI/VCI bit selector 3.

When $2^n$ connections are to be dealt with collectively as a group, logic values of 28-n bits, upper 28-n bits, for example, of the input VPI/VCI and the output VPI/VCI are commonly determined for all connections of the group, according to the embodiment, and the value n is registered as a mask bit length in the routing table together with the partial logic value assigned to the output VPI/VCI, being associated with the partial logic value assigned to the input VPI/VCI.

When the VPI/VCI of the group is inputted, it is supplied to the VPI/VCI converter 1 and the mask-bit generator 2. The VPI/VCI converter 1 outputs the above logic value assigned to the output VPI/VCI to the VPI/VCI bit selector 3, n bits thereof being filled with dummy data, referring to the routing table. The mask-bit generator 2 generates a mask-bit pattern wherein logic '1' is assigned to lower n bits which are corresponding to the dummy data and logic '0' is assigned to other upper 28-n bits which are corresponding to the effective part of the VPI/VCI, in the example.

According to the mask-bit pattern, the VPI/VCI bit selector 3 determines logic of each bit of the output VPI/VCI, by selecting logic of each bit either from the output of the VPI/VCI converter 1 or from the input VPI/VCI.

Figure 2A:
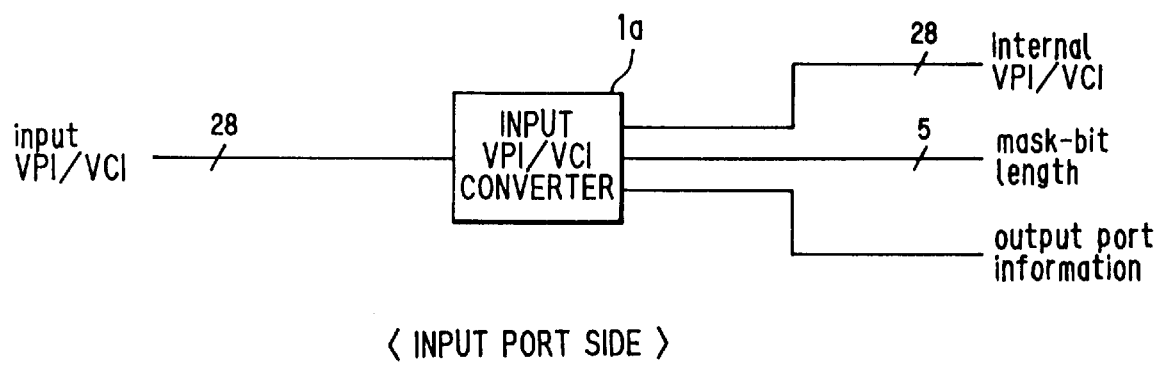
FIG. 2A is a block diagrams illustrating a circuit example of an input-port-side circuit provided to each input port of the ATM exchange of FIG. 1.
Figure 2B:
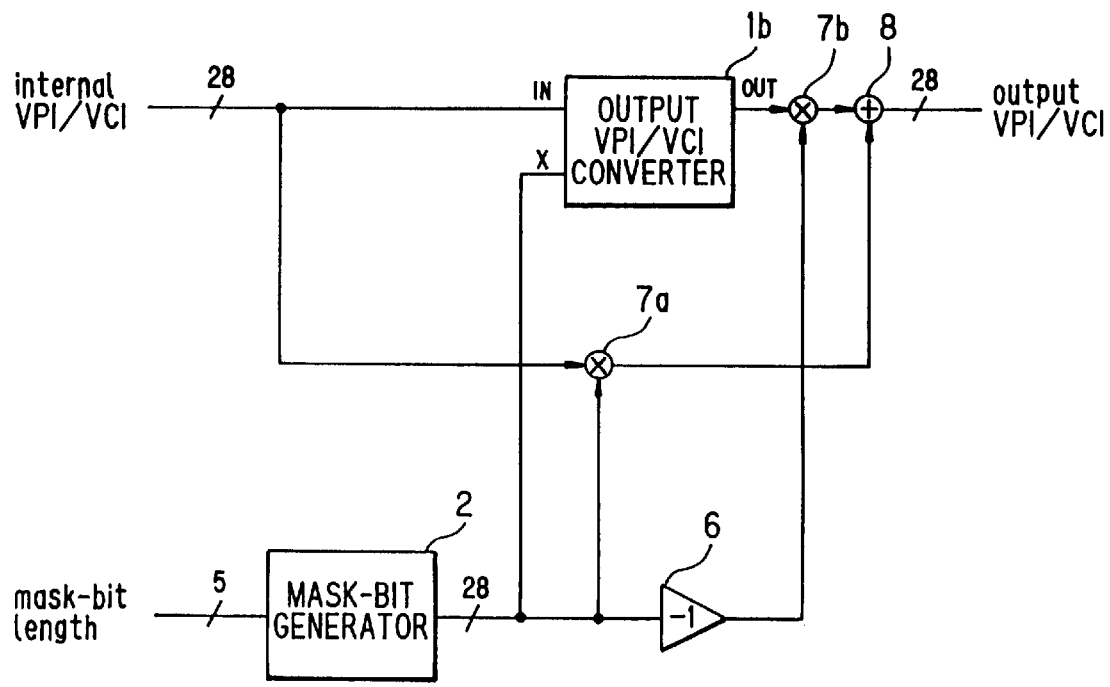
FIG. 2B is a block diagrams illustrating a circuit example of an output-port-side circuit provided to each output port of the ATM exchange of FIG. 1.

FIGS. 2A and 2B are block diagrams illustrating circuit examples of an input-port-side and an output-port-side circuit provided to each input port and each output port, respectively, of the ATM exchange, for realizing VPI/VCI conversion according to the embodiment of FIG. 1.

Figure 3:
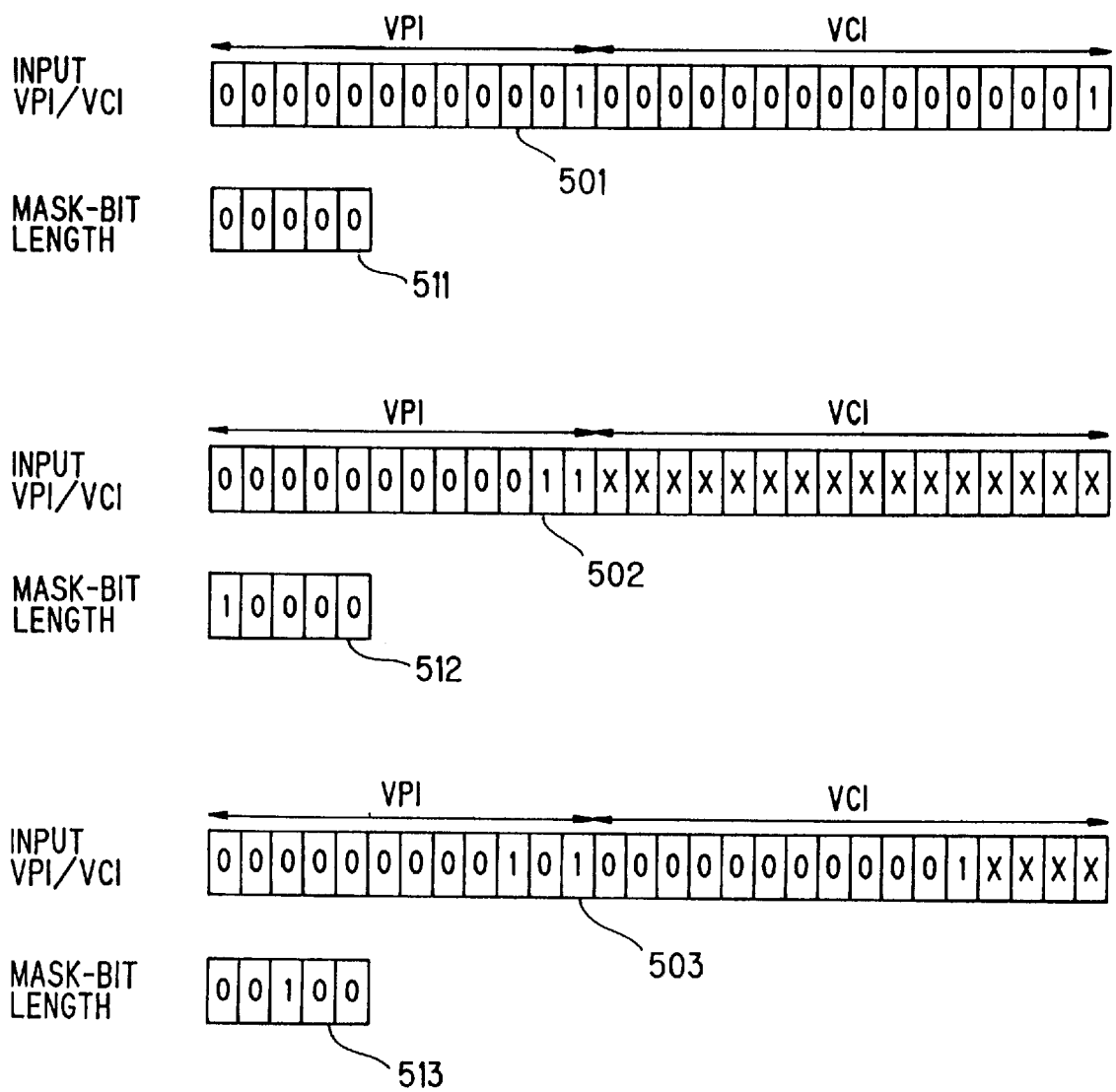
FIG. 3 illustrates examples of data referred to by the input VPI/VCI converter 1a of FIG. 2A.
Figure 4:
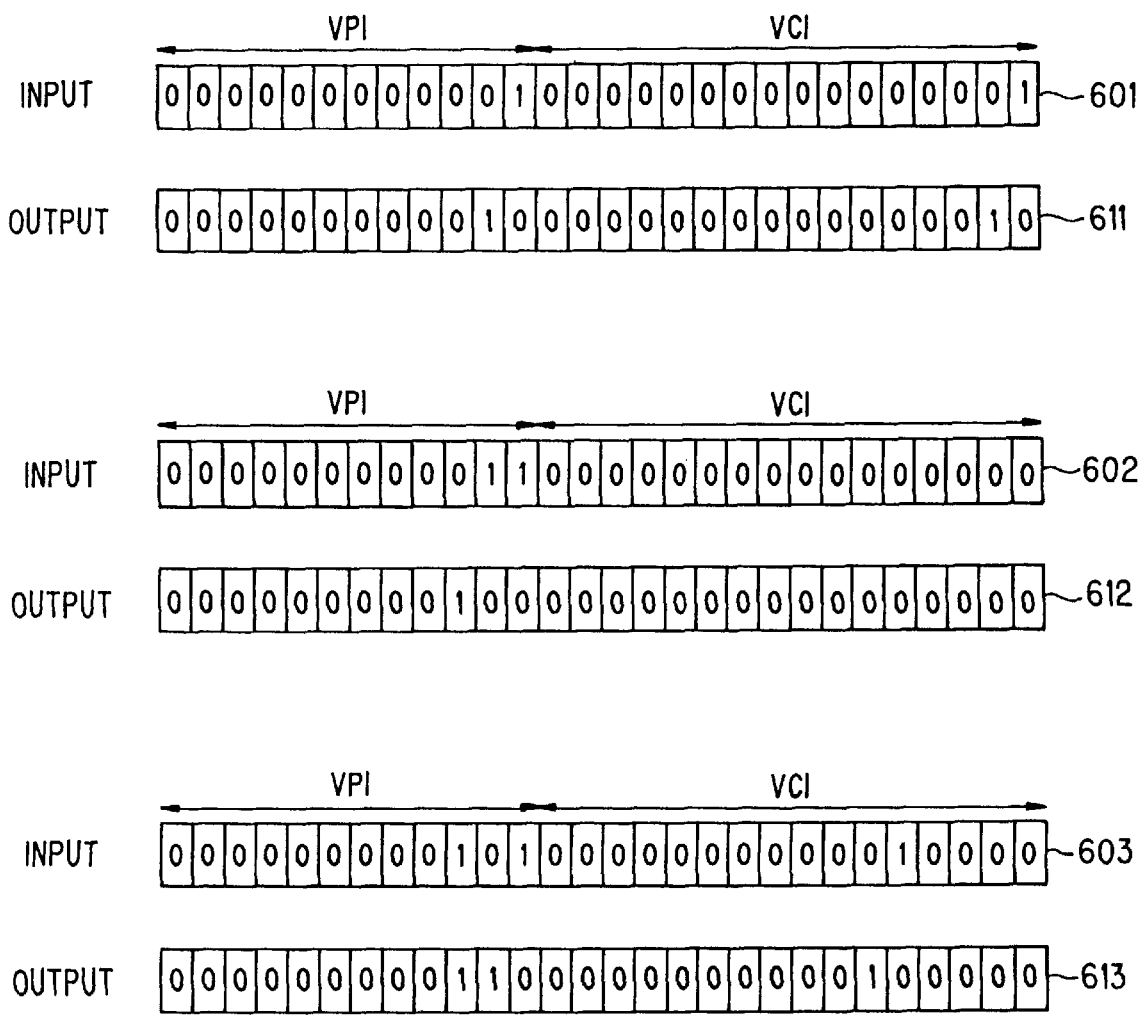
FIG. 4 illustrates examples of data referred to by the output VPI/VCI converter 1b of FIG. 2B.

FIG. 3 illustrates examples of data referred to by an input VPI/VCI converter 1a of FIG. 2A, FIG. 4 illustrates examples of data referred to by an output VPI/VCI converter 1b of FIG. 2B, and FIGS. 5 to 7 illustrate examples of transition of data flowing in the circuit examples of FIGS. 2A and 2B.

Now, operation of the embodiment is described referring to circuit examples of FIGS. 2A and 2B, and data examples of FIGS. 3 to 8.

When a cell arrives to an input port of the ATM exchange, the VPI/VCI bit sequence of 28 bits is extracted from the cell and supplied as the input VPI/VCI to the input VPI/VCI converter 1a of the input port. The input VPI/VCI converter 1a outputs an internal VPI/VCI, a mask-bit length and output port information corresponding to the input VPI/VCI.

The output port information is used for controlling an ATM switch (not depicted) to switch the concerning cell towards an output port designated by the connection information, in the same way with an ordinary ATM exchange, and detailed description is omitted.

For simplifying configuration of the ATM switch, the internal VPI/VCI may be represented by a bit sequence shorter than the input VPI/VCI. Here, in the embodiment, it is assumed that the input VPI/VCI itself is outputted as the internal VPI/VCI.

In the routing table, the mask bit length n is registered associated with the logic value of the input VPI/VCI as beforehand described.

In the example of FIG. 3, mask bit length 511 of 0 is registered being associated with a logic value 501 of '001/0001' (in hexadecimal), which represents the input VPI/VCI assigned to a connection to be dealt with individually, mask bit length 512 of 16 is registered being associated with a logic value 502 of '003/(0000 to FFFF)', which represents the input VPI/VCI assigned to connections to be dealt with according to VP routing, and mask bit length 513 of 4 is registered being associated with a logic value 503 of '005/(0010 to 001F)', which represents the input VPI/VCI assigned to a group of 16 connections to be dealt with collectively.

The mask bit length, which is retrieved by the input VPI/VCI converter 1a referring to the routing table, is transmitted to the output-port-side circuit of FIG. 2B, being attached to the concerning cell to be switched, for example.

In the output-port-side circuit, an output VPI/VCI converter 1b, a first bit multiplier 7a, a second bit-multiplier 7b and a bit adder 8 are comprised together with the mask-bit generator 2. The first bit multiplier 7a, the second bit-multiplier 7b and the bit adder 8 compose the VPI/VCI bit selector 3 of FIG. 1.

The mask bit length is supplied to the mask-bit generator 2, which generates a mask-bit pattern of 28 bits wherein logic '1' is assigned to lower n bits and logic '0' is assigned to other upper 28-n bits when value of the mask bit length is n.

The mask-bit pattern is supplied to the output VPI/VCI converter 1b together with the internal VPI/VCI of 28 bits.

The output VPI/VCI converter 1b retrieves a logic value to be used as the output VPI/VCI corresponding to the internal VPI/VCI, by referring to the routing table with the logic value of the VPI/VCI whereof logic of bits indicated by the mask-bit pattern is ignored.

FIG. 4 shows examples of logic values registered in the routing table.

In the example of FIG. 4, output logic 611 of '002/0002' is registered being associated with a logic value 601 of '001/0001', which represents the input VPI/VCI assigned to a connection to be dealt with individually, output logic 612 of '008/0000' is registered being associated with a logic value 602 of '003/0000', which represents the input VPI/VCI assigned to connections to be dealt with according to conventional VP routing, and output logic 613 of '005/0020' is registered being associated with a logic value 603 of '005/0010', which represents the input VPI/VCI assigned to a group of 16 connections to be dealt with collectively.

Returning to FIG. 2B, the internal VPI/VCI is multiplied by the mask-bit pattern through the first bit multiplier 7a, and the output logic of the output VPI/VCI converter 1b is multiplied at the second bit multiplier 7b by the inverted logic of the mask-bit pattern which is obtained by inverting the mask-bit pattern through the inverter 6.

The outputs of the first and the second bit multiplier 7a and 7b are added by the bit adder 8 and outputted as the output VPI/VCI to be attached to the transmission cell.

Figure 5:
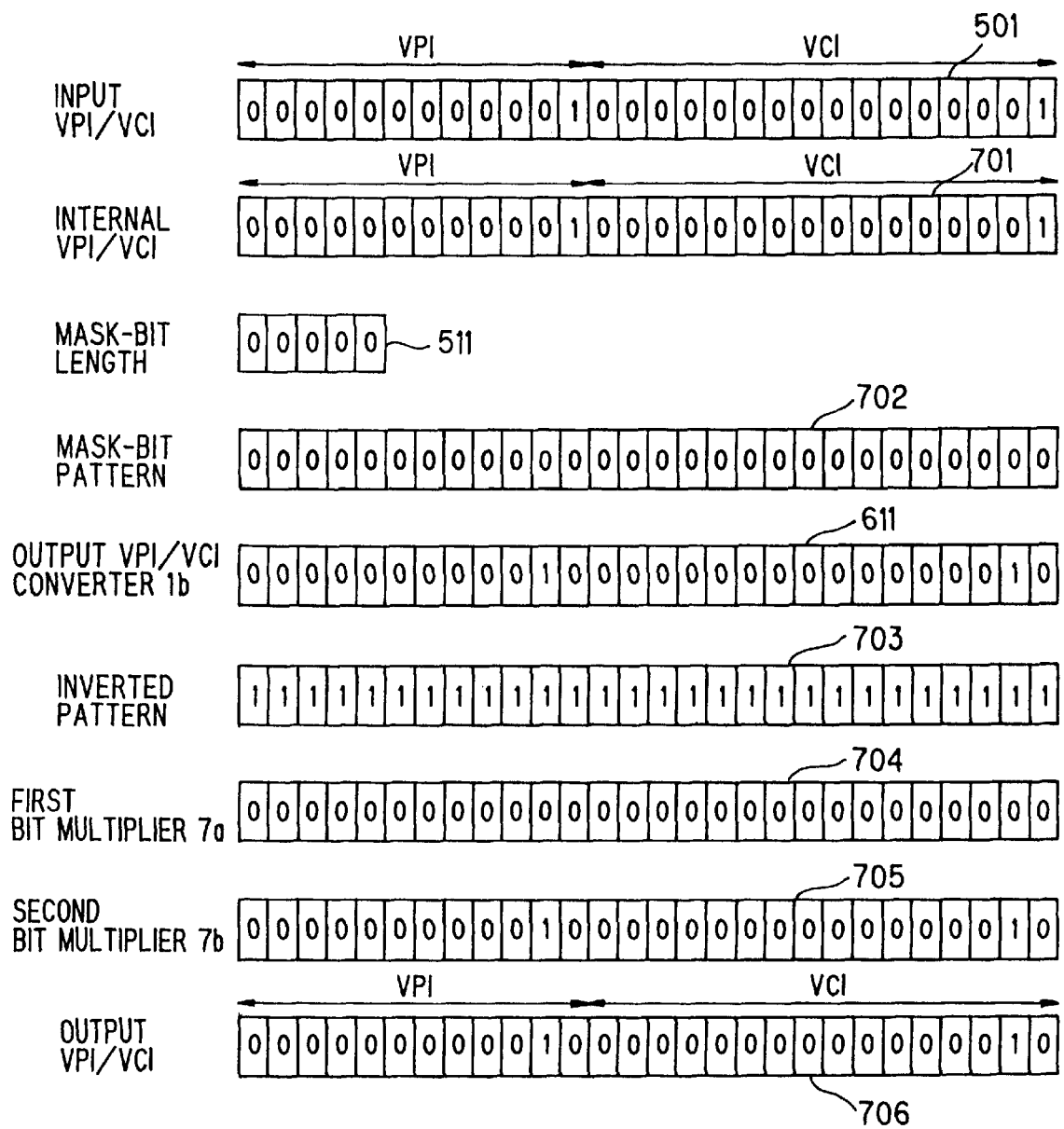
FIG. 5 illustrates an example of transition of data flowing in the circuit examples of FIGS. 2A and 2B.

FIG. 5 shows transition of data flowing in the circuit examples of FIGS. 2A and 2B, when individual routing of a cell having the input VPI/VCI 501 of '001/0001', for example, is performed.

The input VPI/VCI converter 1a outputs the internal VPI/VCI 701 having the same logic value with the input VPI/VCI 501, and the mask bit length 511 of 0 referring to the routing table with the input VPI/VCI 501. The mask-bit generator 2 outputs the mask bit pattern 702 of '000/0000' indicating that all bits should be cared, according to the mask bit length 511. Therefore, the output VPI/VCI converter 1b refers to the routing table with whole bit pattern of the internal VPI/VCI 701 and obtains a logic value 611 of '002/0002', as illustrated in FIG. 4.

The internal VPI/VCI 701 is supplied to the first bit multiplier 7a and multiplied by the mask-bit pattern 702 of all '0'. Therefore, the output pattern 704 of the first bit multiplier 7a becomes all '0'. The output 703 of the inverter 6 becomes all '1', and therefore the output 705 of the second bit multiplier 7b has the same pattern with the output logic 611 of the output VPI/VCI converter 1b, which is outputted as the output VPI/VCI 706 after added with the output pattern 704 of all '0'.

Figure 6:
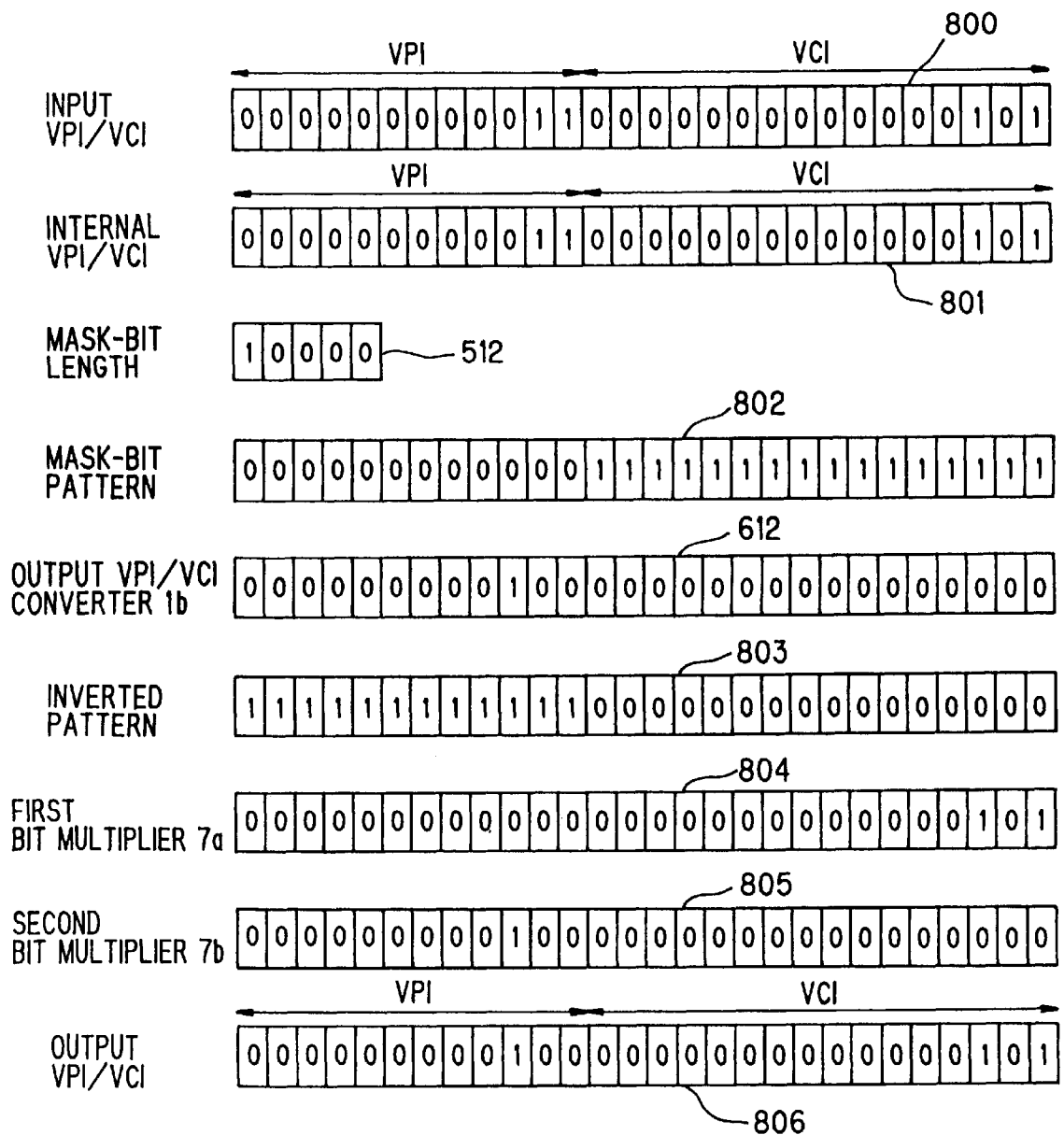
FIG. 6 illustrates another example of transition of data flowing in the circuit examples of FIGS. 2A and 2B.

FIG. 6 shows another example of transition of data flowing in the circuit examples of FIGS. 2A and 2B, when VP routing of a cell having the input VPI/VCI 800 of '003/0005', for example, is performed.

The input VPI/VCI converter 1a outputs the internal VPI/VCI 801 having the same logic value with the input VPI/VCI 800, and the mask bit length 512 of 16 referring to the routing table with the input VPI/VCI 800. The mask-bit generator 2 outputs the mask bit pattern 802 of '000/FFFF' indicating that only upper 12 bits should be cared, according to the mask bit length 512. Therefore, the output VPI/VCI converter 1b refers to the routing table with upper 12 bits of the internal VPI/VCI 801 together with lower 16 bits of all '0' and obtains a logic value 612 of '004/0000', as illustrated in FIG. 4.

The internal VPI/VCI 801 is supplied to the first bit multiplier 7a and multiplied by the mask-bit pattern 802 of '000/FFFF'. Therefore, the output pattern 804 of the first bit multiplier 7a becomes '000/0005', with upper 12 bits of '0' and lower 16 bits having the same value with the internal VPI/VCI 801. The output 803 of the inverter 6 becomes 'FFF/0000', and therefor, upper 12 bits of the output 805 of the second bit multiplier 7b has the same pattern with the output 612 of the output VPI/VCI converter 1b and lower 16 bits becomes '0000'. Therefore, the output VPI/VCI 806 of '004/0005' is obtained as the output of the adder 8, wherein upper 12 bits (VPI) are converted according to the routing table, and lower 16 bits (VCI) have the same value with the input VPI/VCI.

Figure 7:
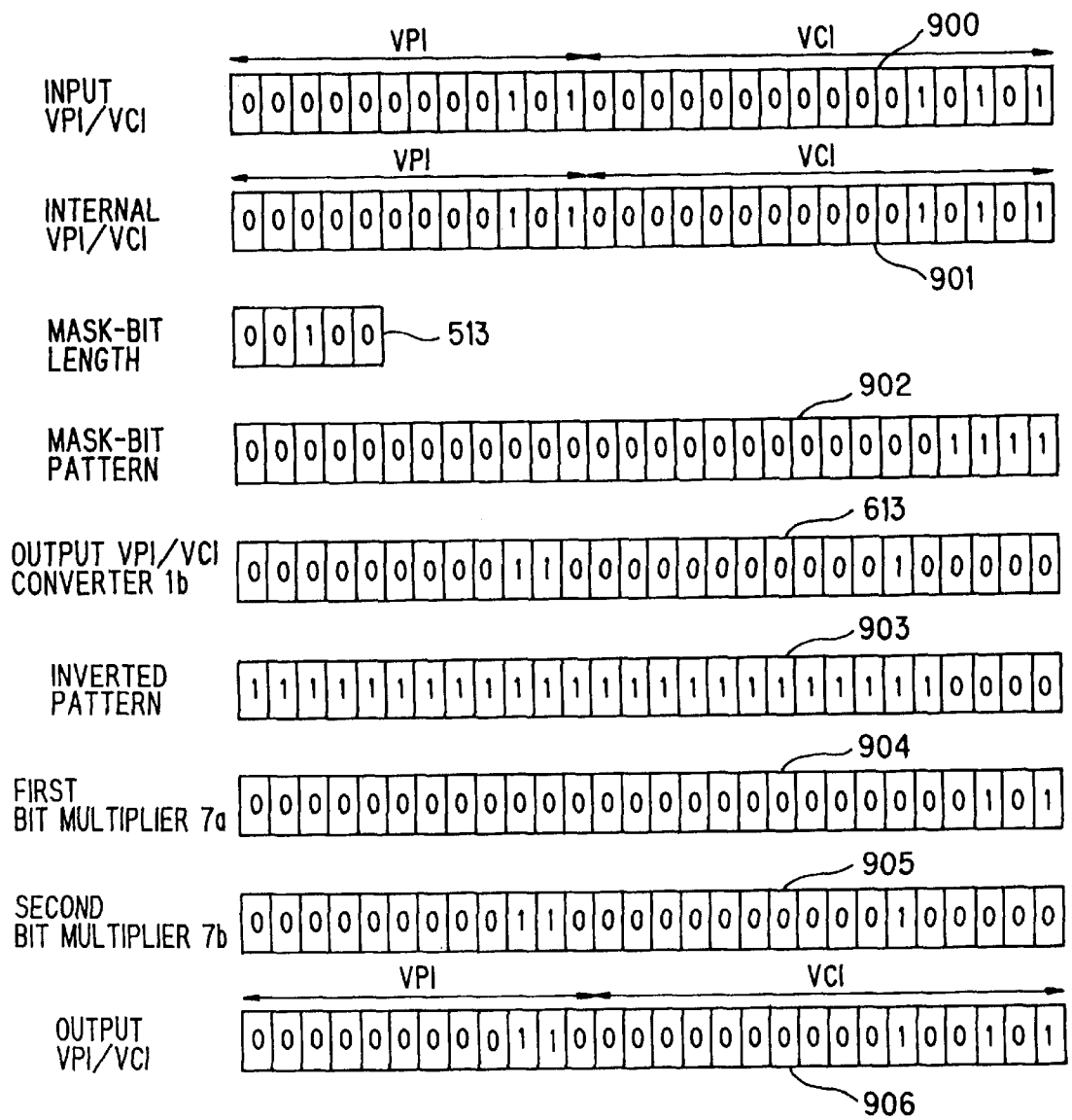
FIG. 7 illustrates still another example of transition of data flowing in the circuit examples of FIGS. 2A and 2B.

FIG. 7 shows still another example of data transition, when collective routing (of 16 connections) of a cell having the input VPI/VCI 900 of '005/0015', for example, is performed.

The input VPI/VCI converter 1a outputs the internal VPI/VCI 901 having the same logic value with the input VPI/VCI 900, and the mask bit length 513 of 4 referring to the routing table with the input VPI/VCI 900. The mask-bit generator 2 outputs the mask bit pattern 902 of '000/000F' indicating that lower 4 bits should be ignored, according to the mask bit length 513. Therefore, the output VPI/VCI converter 1b refers to the routing table with upper 24 bits of the internal VPI/VCI 801 together with lower 4 bits of all '0' and obtains a logic value 613 of '006/0020', as illustrated in FIG. 4.

The internal VPI/VCI 901 is supplied to the first bit multiplier 7a and multiplied by the mask-bit pattern 902 of '000/000F'. Therefore, the output pattern 904 of the first bit multiplier 7a becomes '000/0005', with upper 24 bits of '0' and lower 4 bits having the same value with the internal VPI/VCI 901. The output 903 of the inverter 6 becomes 'FFF/FFF0', and therefor, upper 24 bits of the output 905 of the second bit multiplier 7b has the same pattern with the output 613 of the output VPI/VCI converter 1b and lower 4 bits becomes '0'. Therefore, the output VPI/VCI 906 of '006/0025' is obtained as the output of the adder 8, wherein upper 24 bits are converted according to the routing table, and lower 4 bits have the same value with the input VPI/VCI.

Thus, cells of 16 connections, whereto input VPI/VCIs from '005/0010' to '005/001F' are assigned, respectively, can be routed collectively so as to have output VPI/VCIs from '006/0020' to '006/002F', in the example.

In the same way, by changing the value of the mask-bit length n (n=1, 2, . . . , 27), $2^n$ connections can be dealt with collectively, according to the embodiment. Therefore, by selecting an appropriate mask-bit length n for each group of connections flowing in the same direction, a supple collective routing can be performed with minimum waste of VCI resources, and for a large number of groups up to $2^{27}$, if desired.

Heretofore, an embodiment of the present invention is described referring to examples illustrated in the drawings. However, the scope of the invention is not limited within these examples.

As to the mask-bit pattern, for example, lower n bits thereof are described to be used as mask bits having logic '1', when the mask bit length is n. However, n bits of any bit position may be used as the mask bits having logic '1', or having logic '0'.

What is claimed is:

1. An ATM exchange comprising:

a VPI/VCI converter for retrieving a logic value according to an input VPI/VCI value written in a VPI/VCI field of header information of a cell arriving to an input port of the ATM exchange, said logic value being predetermined for each of individual connections to be dealt with individually and groups of connections to be dealt with collectively by the ATM exchange;

a mask-bit generator for generating a mask-bit pattern having the same bit length with the VPI/VCI field, a number, which is predetermined for each of the groups of connections, of lower bits of the mask-bit pattern having logic '1' and other upper bits thereof having logic '0' when the mask-bit pattern concerns one of the groups of connections, and all bits of the mask-bit pattern having logic '0' when the mask-bit pattern concerns one of the individual connections; and a VPI/VCI bit selector for generating an output VPI/VCI value to be written in the VPI/VCI field of the cell before the cell is transmitted from an output port of the ATM exchange, by selecting logic of each bit of the output VPI/VCI value to have the same logic with a corresponding bit of the logic value out-putted from the VPI/VCI converter when a corresponding bit of the mask-bit pattern has logic '0', and to have the same logic with a corresponding bit of the input VPI/VCI value when a corresponding bit of the mask-bit pattern has logic '1'.

2. An ATM exchange comprising:

an input VPI/VCI converter provided to each input port of the ATM exchange for retrieving a mask-bit length and output port information according to which a cell arriving at the input port is to be switched, by referring to a routing table according to an input VPI/VCI value written in a VPI/VCI field of header information of the cell, said mask-bit length being predetermined for each of groups of connections to be dealt with collectively by the ATM exchange when the mask-bit length concerns one of the groups of connections, and being 0 when the mask-bit length concerns one of the individual connections to be dealt with individually;

a mask-bit generator provided to each output port of the ATM exchange for generating a mask-bit pattern having the same bit length with the VPI/VCI field, a number, which the mask-bit length designates, of lower bits of the mask-bit pattern having logic '1' and other upper bits thereof having logic '0';

an output VPI/VCI converter provided to each output port of the ATM exchange for retrieving a logic value by referring to the routing table according to the input VPI/VCI, said logic value being predetermined for each of the individual connections and the groups of connections; and an VPI/VCI bit selector provided to each output port of the ATM exchange for generating an output VPI/VCI value to be written in the VPI/VCI field of the cell before the cell is transmitted from the output port, by selecting logic of each bit of the output VPI/VCI value to have the same logic with a corresponding bit of the logic value outputted from the output VPI/VCI converter when a corresponding bit of the mask-bit pattern has logic '0', and to have the same logic with a corresponding bit of the input VPI/VCI value when a corresponding bit of the mask-bit pattern has logic '1'.

3. An ATM exchange as recited in claim 1; said VPI/VCI bit selector comprising:
- a first bit multiplier for outputting a first bit pattern, logic of each bit of the first bit pattern having AND logic of corresponding bits of the input VPI/VCI value and the mask-bit pattern;
- an inverter for outputting an inverted mask-bit pattern by inverting the mask-bit pattern;
- a second bit multiplier for outputting a second bit pattern, logic of each bit of the second bit pattern having AND logic of corresponding bits of the logic value and the inverted mask-bit pattern; and
- a bit adder for outputting the output VPI/VCI value by logically adding the first bit pattern and the second bit pattern.

4. An ATM exchange as recited in claim 2; said VPI/VCI bit selector comprising:
- a first bit multiplier for outputting a first bit pattern, logic of each bit of the first bit pattern having AND logic of corresponding bits of the input VPI/VCI value and the mask-bit pattern;
- an inverter for outputting an inverted mask-bit pattern by inverting the mask-bit pattern;
- a second bit multiplier for outputting a second bit pattern, logic of each bit of the second bit pattern having AND logic of corresponding bits of the logic value and the inverted mask-bit pattern; and
- a bit adder for outputting the output VPI/VCI value by logically adding the first bit pattern and the second bit pattern.

* * * * *